United States Patent [19]

Fan et al.

[11] 4,438,000

[45] Mar. 20, 1984

[54] METHOD OF FILTRATION USING SEMIFLUIDIZED BEDS

[75] Inventors: Liang-tseng Fan, Manhattan, Kans.; Edward H. Hsu, Houston, Tex.

[73] Assignee: Kansas State University Research Foundation, Manhattan, Kans.

[21] Appl. No.: 405,612

[22] Filed: Aug. 10, 1982

[51] Int. Cl.³ ............................................. B01D 23/10
[52] U.S. Cl. ................................... 210/786; 210/807; 210/289
[58] Field of Search ............... 210/661, 741, 807, 808, 210/289, 291, 610, 618, 630, 274, 786; 55/79, 475; 34/10; 23/313 FB

[56] References Cited

U.S. PATENT DOCUMENTS

| 3,374,052 | 3/1968 | Fan et al. | 210/661 |
| 4,137,162 | 1/1979 | Mohri et al. | 210/661 |
| 4,157,959 | 6/1979 | Wen et al. | 210/807 |
| 4,253,947 | 3/1981 | Fan et al. | 210/610 |
| 4,297,218 | 10/1981 | Bals | 210/661 |
| 4,371,442 | 2/1983 | Bals | 210/661 |

FOREIGN PATENT DOCUMENTS

| 686533 | 5/1964 | Canada | 210/661 |
| 1014808 | 12/1965 | United Kingdom | 210/661 |
| 1147054 | 4/1969 | United Kingdom | 210/661 |

*Primary Examiner*—Charles N. Hart
*Assistant Examiner*—Wanda L. Millard

[57] ABSTRACT

A methfd of filtering fine solids from a fluid (gas or liquid) flowing upwardly through a chamber containing a semifluidized bed of discrete filter particles. During a filtering operation, the upper or packed section of the bed is immobilized by a porous retainer at the top of the chamber and, as the operation proceeds, the packed bed section gradually expands downwardly, and the fluidized bed section below it progressively decreases in size, thereby extending the duration of the filtration run and yielding a more uniform distribution of solids throughout the filter medium.

10 Claims, 8 Drawing Figures

METHOD OF FILTRATION USING SEMIFLUIDIZED BEDS

BACKGROUND AND PRIOR ART

The field of this invention is the art of filtration of particulate solids from a liquid or gas, and particularly filtration operations carried out with semifluidized beds of filtration media. Semifluidization refers to the phenomenon created when a mass of fluidized particles is compressed from above with a porous restraining plate, giving rise to the formation of a fluidized bed and a fixed bed in series within a single containing vessel. The concept of semifluidization was first disclosed by Fan et al, *A.I. Ch. E. Journal*, Vol. 5, pp. 407–409, Sept. 1959, "Semifluidization". See also Fan et al U.S. Pat. No. 3,374,052. As shown by the cited publications, semifluidized beds were first described as a means for carrying out chemical reactions in which the high reaction rate of a fluidized bed is obtained within the initial fluidized portion of the bed, while the reaction is completed in the final packed section of the bed, taking advantage of the higher completion rate of fixed bed reactors.

Semifluidized beds have also been referred to as "convertible" beds, since the relative size or extent of the fluidized and packed sections are subject to control, the bed being convertible over the range from a full bed fluidization to a completely packed bed, with the relative size and extent of the fluidized and packed sections being selectively variable. The degree of fluidization of a semifluidized bed can be controlled by the position of the upper porous retainer and/or by the fluidization velocity. As the retainer is moved downwardly and/or as the fluidization velocity is increased, the downward extent of the packed section is increased. Thus, processes may be carried out with fluidized and packed bed sections of selected relative size. Further, during a chemical process or physical operation, the extent of the packed section relative to the fluidized section can be increased or decreased as required for promoting the process or operation. See, for example, Wen & Fan U.S. Pat. No. 4,157,959 and Fan & Wen U.S. Pat. No. 4,253,947. Further, as shown by these patents, at the conclusion of a filtration operation or a biological reaction, the upper retainer may be raised to a position at which the bed can be fully fluidized for purpose of removing accumulated solids, such as filtered solids, or bacterial floc.

Wen & Fan U.S. Pat. No. 4,157,959 describes the application of a convertible semifluidized bed of a filtration medium to the removal of fine particulate solids from a liquid or gas. The teachings of that patent are therefore particularly relevant to the subject matter of this application. In the method of the Wen & Fan patent, the filtration operation is started with all, or at least most, of the filter medium in the form of a packed bed. The filtration proceeds with the fluid containing the particulates to be filtered being passed upwardly through the packed bed from the bottom to the top thereof. As with conventional packed bed filters, the solids accumulate in the entry section of the bed, the extent of solids penetration into the bed being limited, and with the formation of a typical filter cake across the lower end of the fixed bed. This causes the usual large increase in pressure drop across the bed, or more particularly the cake portion thereof, so that the filtration operation would normally need to be discontinued as the condition of complete plugging of the entry portion of the filter bed is reached. However, the plugging requiring shutdown is prevented, as described in U.S. Pat. No. 4,157,959, by lifting the upper retaining plate so that the filter cake-containing lower portion of the bed breaks off and becomes fluidized. The filtered solids of the cake are, in effect, resuspended in the fluidized section. Moreover, the motion of the fluidized particles tends to scour the bottom of the fixed bed as the filtration operation continues. This scouring action delays the buildup of the next increment of filter cake. When a second filter cake has accumulated to a point approaching the condition of plugging, the upper retainer is again lifted to again resuspend the filtered solids. This filtering and resuspension process is continued with progressive increase in the size of the fluidized bed portion of the bed and corresponding decrease in the packed bed section. The process may be continued until the packed section approaches the minimal depth for preventing breakthrough of the filtered solids. At that time, the filtration operation is terminated, and the retainer plate is raised to a height permitting the entire bed to be fluidized so that the accumulated solids can be removed prior to the start of the next filtration cycle.

One disadvantage of the filtration method of U.S. Pat. No. 4,157,959 in commercial applications is that means must be provided for staged upward movement of the media retainer plate, and associated controls and instrumentations so to achieve movements at optimum times for maximizing the filtration capacity of the apparatus. For best results the sensing of pressure buildup across the filter cake interface needs to be carefully measured at each stage. Also, as the load of resuspended solids within the fluidized section increases, the rate at which the filter cake develops will be progressively faster. Therefore, the retainer will be moved at increasingly frequent intervals as the filtration cycle proceeds.

SUMMARY OF INVENTION

This invention relates to an improved method of filtration using a semifluidized bed, which provides important operational advantages over the method disclosed in U.S. Pat. No. 4,157,959. In the method of the present invention, the filtration cycle is started with a minor portion of the filtration medium in the form of a packed section above a fluidized section containing the major portion of the filtration medium. In the first phase of the filtration operation, the relatively small packed section functions as a conventional fixed bed filter with the removed solids in the bottom or entry portion of the packed section adjacent to interface between the packed and fluidized sections. The circulating particles of the filtration medium act to scour the bottom of the packed bed section, delaying the build-up of the pressure drop, as in connection with the prior method of U.S. Pat. No. 4,157,959. As is known with respect to the operation of fluidized beds, the circulating media particles will tend to establish a circulation pattern which will affect the upward flow pattern of the fluidizing liquid or gas containing the solid particles to be filtered. As the filter cake builds up across the lower end portion of the packed bed, there will inherently be a variation in the rate at which solids are deposited across the interface. An important discovery underlying the present invention is that this unequal deposition of filtered solids can be taken advantage of to carry out a novel filtration process.

In accordance with the present invention, the first phase of the filtration is carried out without appreciably increasing the percent of the filtration medium in the packed section. This first phase is continued until a filter cake of removed solids has accumulated across the packed section interface, and until one area of the interface adjacent to wall portion of the filtration chamber contains a larger accumulation of solids than in an area adjacent an opposed wall portion of the chamber. This condition is reached as the buildup of the filter cake approaches a point at which the filtration operation would have been discontinued for removal of accumulated solids in a conventional fixed bed filtration, or in which the retainer plate would have been moved upwardly to break off the filter cake, and resuspend the filtered solids, as described in U.S. Pat. No. 4,157,959. In accordance with the method of the present invention, however, filtration need not be discontinued and the retainer plate need not be moved. Instead, the filtration is continued in a second phase in which there is fluid flow predominantly through the less plugged area of the packed section interface. With this shift in flow, there is an increase in local flow velocity through the less completely packed section of the filter cake. This results in the addition of filter medium particles to the portion of the packed bed, increasing the downward extent of the packed section along one wall portion of the chamber.

In the second phase of the filtration, the solids being filtered are deposited together with the filter medium. The result is somewhat analagous to that produced with the addition of body feed filter aid to the slurry in precoat filtrations. The codeposition of the filter medium and filtered solids onto the progressively downwardly extending portion of the packed section limits the increase in pressure drop across the packed section. This effect permits the filtration cycle to be greatly extended. In a filtration operation, where maximum use is made of the second phase filtration, the amount of fluid filtered can be increased 4 to 8 times or more as compared with a conventional fixed bed filter. Moreover, the filtrate obtained with respect to the solids removal is of as good quality as that produced by a conventional fixed bed filter.

In the preferred use of the method of this invention, the packed section at the start of the filtration is of minimal extent, being only sufficient in depth to prevent breakthrough of the solids being filtered. This leaves the maximum amount of the filtration medium in the fluidized section so that the second phase of the filtration can be carried out for the maximum time. Preferably, the second phase is continued until substantially all of the filtration medium has been transferred from the fluidized portion to the packed section. Further, after completion of the second phase, a final third filtration phase can be used in which the packed section again acts as a conventional fixed bed filter until it approaches plugging. With this combination of steps, and in relation to a given volume of filtration medium, the filtration cycle can be greatly extended in length, with much more volume of fluid processed, and a high quality solids-free filtrate obtained. Further, all of these advantages can be obtained without a complicated apparatus system in which progressive upward movement of the retainer is required. At the conclusion of the filtration, however, as in prior practice, the retainer can be lifted to a level at which the bed can be fully fluidized, permitting easy removal of the accumulated solids with retention of the filter medium. The next filtration cycle can be started after a short cleaning period by returning the retainer to the same operating position.

Other features, advantages, and objects of the invention will become apparent from the specification and drawings.

DRAWINGS

DETAILED DESCRIPTION

Figure 1:
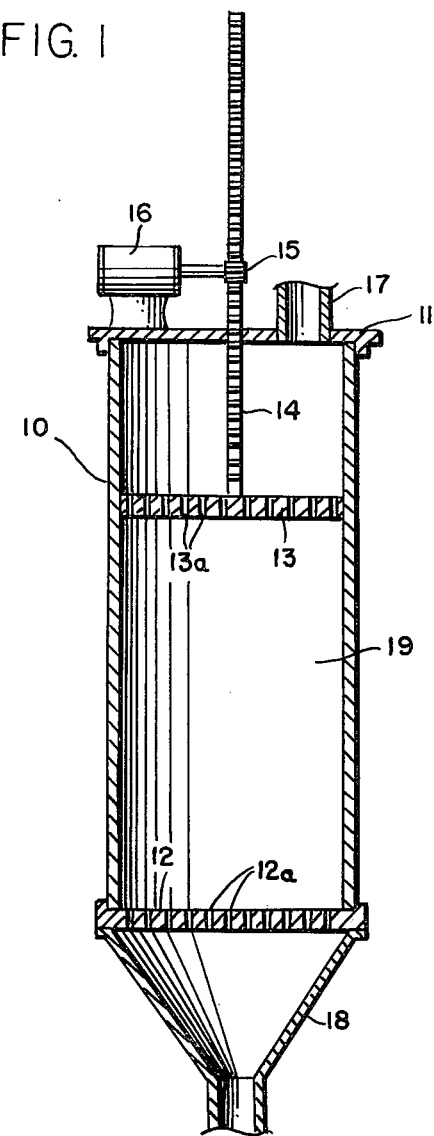
FIG. 1 is a somewhat schematic vertical sectional view of a filtration apparatus which can be used for performing the method of this invention.

An apparatus which may be used for practicing the present invention is described in prior U.S. Pat. Nos. 3,374,052 and 4,157,959. The apparatus illustrated in the drawings of this application is similar to that shown in these patents and includes a vertically-extending cylindrical column or housing 10, cover 11, a porous distributor in the form of a sieve plate 12 at the lower end of the column, an upper porous retainer in the form of a sieve plate 13 slidably mounted within column 10, a rack bar 14 connected to plate 13 and extending upwardly through cover 11, a pinion 15 driven by motor 16 for selectively raising and lowering the perforated plate 13, an outlet conduit 17 communicating with the upper portion of the cylindrical housing, and a conical inlet section 18 extending downwardly below the distributor plate 12. The filter chamber 19 is the space in which the granular filter medium is confined and is therefore defined by the cylindrical side wall of the column 10 and by the perforated upper and lower plates 13 and 12, respectively. Although the porous upper plate is shown to be movable for cleanup operations, it can remain in fixed relation to the remainder of the apparatus when the filtering method of this invention is carried out.

Apertures 12a and 13a are schematically represented in the drawings and are shown to be uniformly spaced from each other in the respective plates. The size of the apertures should be small enough to prevent or restrain passage of the granules or particles of the filter medium without at the same time preventing passage of the fine solids or particulates intended to be captured by that medium. For direction of the upward flow of fluid (gas or liquid) to provide different velocities in different vertical zones of the chamber 19, the sizes of openings 12a or 13a, or both, of the lower and upper plates may be varied slightly, or the pattern of apertures in one or both of the plates may be varied, to achieve the velocity differential. Alternatively, the plates 12 and 13 may each have apertures of equal size arranged in a uniform pattern, but certain of such openings may be partially or completely closed to achieve the difference in velocity necessary at the commencement of a filtering cycle. It will also be appreciated that similar results may be achieved by modifying the shape or construction of inlet section 18. While such variations can comprise desirable apparatus designs for purpose of the present invention, the method can also be carried out with standard fluid inlet means, which utilizes a fluid supply and distributor designed to achieve relatively uniform flow of the fluidizing fluid.

One of the characteristics of a fluidized bed is that in operation, the rising fluid passing upwardly and providing buoyancy for the suspended solids tends to produce a distinct or predominant circulation pattern of the suspended solids within the bed. This medium circulation in turn affects and modifies the flow of the fluidizing gas or liquid. Inherently, therefore the operation of a fluidized bed results in a variation of upward flow velocities in different sections of the bed. For more complete discussion, see Kunii & Levenspiel, *Fluidization Engineering*, Chap. 5, "The Emulsion Phase in Dense Bubbling Beds", pp. 140-164 (1977, E. Krieger Publ. Co.). The differences in upward flow velocities as induced by the circulation of the suspended particles within the fluidized bed is taken advantage of in going from the first to second filtration phases of the present invention, as explained more fully below.

Selection of the particular granular filter medium will depend on the filtration operation to be carried out. In general, the medium will be one which is capable of retaining the particulates or fine solids carried by the fluid (gas or liquid) when the fluid is passed through the bed in a fixed or packed state. If a granular filter medium would be suitable for a gravitational filtration for the specific fluid and solids contained therein, it should be usable for purposes of this invention. Where only filtration is involved, the bed granules would normally be inert to the fluid being filtered as well as to the filtered solids; however, as indicated, such a column may also advantageously be used for chemical or biological reactions, in which case the upper fixed bed section may be used to restrain solid biological waste products or solid chemical reaction products. In any event, the particles or granules of the upper bed section constitute the porous filter medium. The bed may be formed of particles or granules of sand, glass beads, or a wide variety of other granular filter materials. It will be understood that the density and sizes of the particles will be adjusted for the given system to be filtered. Also, in those cases where filtration occurs in conjunction with a biological reaction, as disclosed in U.S. Pat. No. 4,253,947, the granular medium that serves as a bacterial carrier in the reactor, and which is innoculated with bacteria in accordance with known practice, must be compatible with such bacteria. Again, sand which has been sized to obtain the desired particle size is suitable, but other usable carriers include coal, carbon, alumina, plastic particles, and the like. In some cases, mixtures of different materials with different densities and particle sizes may be advantageous.

A suitable pump is provided to supply the gas or liquid to be filtered under pressure to inlet section 18. The pump for example, may be a piston-type pump providing a constant flow volume, or a centrifugal-type pump which permits the flow volume to decrease as the pressure drop increases across the packed section of the bed. The velocity of the incoming fluid should be greater than the minimum fluidization velocity for the particular filter medium. In general, the fluid should have an upward velocity of at least 2 times the minimum fluidization velocity for the bed when that bed is unrestrained (i.e., when a freeboard space exists between the upper foraminous plate 13 and the bed therebelow). Usually the upward velocity of the fluid will fall within the range of 2 to 10 times the minimum fluidization velocity for an unrestratined bed, a preferred velocity range being from about 3 to 6 times the minimum fluidization velocity.

At a given flow rate greater than the minimum fluidization velocity, the degree of fluidization may be controlled by the position of the upper porous plate 13 and may be expressed as $$X = \frac{\rho_S A(1 - \epsilon_f)(1 - \epsilon_{pa})}{W(\epsilon_f - \epsilon_{pa})} (h_f - h)$$

where X is the fraction of bed particles in the upper packed section of the semifluidized bed, $\rho_S$ is the density of bed particles; A is the cross-sectional area of the bed; $\epsilon_{pa}$ and $\epsilon_f$ are the porosities of the packed and fluidized sections, respectively; W is the mass of the bed particles, $h_f$ is the unrestrained fluidized height of the bed; and h is the position of the upper porous plate or the height of the semifluidized bed.

Figure 3:
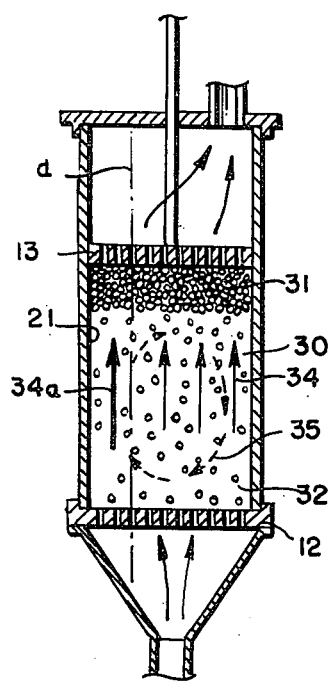
FIGS. 3–7 are schematic simplified vertical sectional views illustrating the general appearance of the semifluidized bed system at different stages in a filtering operation, such stages being keyed to the graph of FIG. 2.
Figure 4:
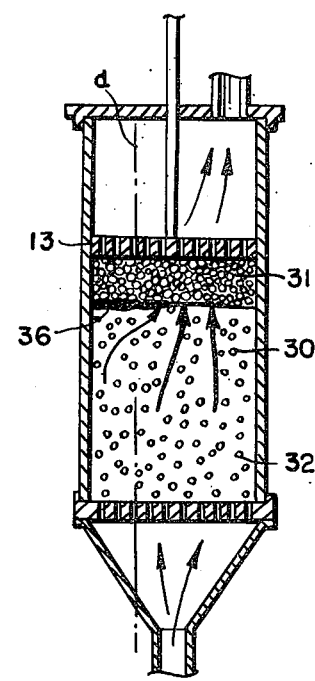
Figure 5:
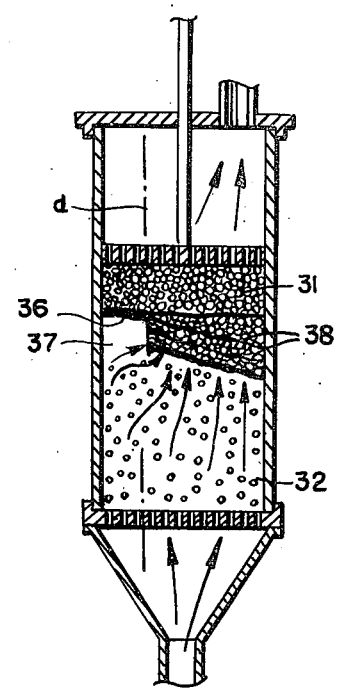

The method of the invention can be visualized more clearly in connection with the operational sequence illustrated in FIGS. 3 to 7 of the drawings. Prior to starting a filtration run, the top porous plate 13 is moved to a predetermined position, which depending on the flow velocity to be used, will provide the desired relative sizes of the packed and fluidized sections of the bed. Referring to FIG. 3, the semifluidized bed is designated in its entirety by numeral 30 and consists of an upper packed section 31 and a lower fluidized section 32. The packed section of the bed consists of particles or granules that would be fluidized if the bed were unrestrained but which are immobilized by the upper porous plate and the upward flow of fluid passing through the chamber 21. The height or thickness of the dense layer of particles in the fixed or packed bed section 31 is substantially less than the height or thickness of the fluidized section 32. In general, at the commencement of a filtering operation, the thickness of the fixed or packed bed section should at least be slightly greater than the minimum thickness necessary to produce effective removal of solids from the fluid flowing upwardly through the chamber. If the packed section is too thin, solids breakthrough can occur.

In the preferred commercial embodiments of the method of the present invention, the packed section at the start of the filtration will contain less than 50% of the total filtration medium, such as 25% or less of the filtration medium. Correspondingly, the fluidized section will contain more than 50% of the filtration medium, such as 75% or more. In an optimized embodiment, the packed section at the start of the filtration can contain not over 10% of the filtration media. The minimum thickness of the packed section will depend on the particular filter medium, the solids being filtered, and other factors, such as the velocity of fluid flow. However, it appears that in general packed section thicknesses of at least 0.07 to 0.1 meters are desirable to prevent solids breakthrough.

The solid arrows 34 in FIGS. 3–8 indicate fluid flow whereas the dashed arrows 35 in FIG. 3 represents the assumed predominant direction of circulation of particles of the filter medium in the fluidized bed section 32. This predominant particle circulation pattern develops and modifies the upward fluid flow so that in steady state operation there is slightly greater velocity of upward flow of fluid in one area of the packed bed. In FIG. 3, the circulation pattern is assumed to be clockwise and the greater velocity of fluid flow is indicated by heavier arrow 34a on the left side of chamber 21. It is to be understood that the presentation is schematic and that in actuality no sharp demarcation exists between the different velocity flows, but that a gradation of velocities will exist, ranging from a higher velocity adjacent the left wall portion to a lower velocity adjacent the right wall portion. It is also to be understood that the particular pattern of FIG. 3 is given only for purposes of illustration and that, for example, the zone of greater velocity might instead be located on the right, or in some other portion of the cross sectional area of the chamber 21 below the packed bed.

Figure 6:
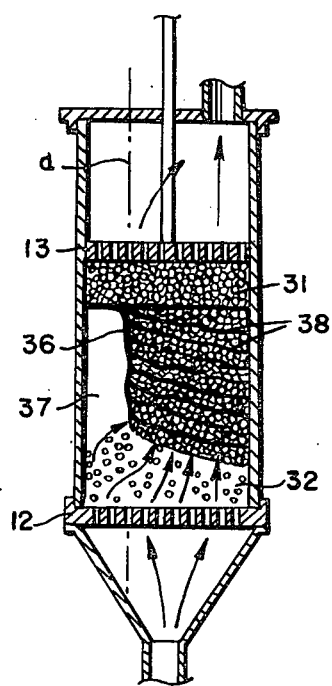

The upward flow of fluid delivers filterable solids to the undersurface of packed bed section 31 but, since the velocity of flow in the first phase of the filtering operation is somewhat greater in one area than another, the buildup of solids will not be completely uniform as the filter cake is formed at the interface of the packed and fluidized sections. Such filtered solids do not penetrate deeply into the packed bed section but are instead deposited in a layer or cake, as indicated by the darkened area 36 in FIG. 4. The accumulated solids 36 increase the resistance to flow through the packed filter bed section more on one side than another, causing a diversion or deflection of flow as the fluid takes the path of lesser resistance through the less completely loaded portion of the packed section interface. This is indicated by the flow arrows in FIG. 4. The local flow velocity adjacent the entry to the less loaded interface portion causes more of the media to deposit. Media particles are transferred from the fluidized section 32 to that part of the packed section through which the predominant flow is occurring. This results in the downward expansion or enlargement of the packed bed section along one wall of the filtration chamber, as indicated in FIG. 6. The downwardly growing portion of the packed bed will develop along a supporting wall rather than in a central area spaced from the walls, which would be unstable under the conditions of fluidized bed operation.

During the second stage of the filtration, as the deposit layer 36 increases in thickness and completely blocks the pores of this part of the packed bed, a type of "cavitation" develops with media particles virtually absent from the cavity zone 37. The velocity of lateral flow near the lower edge of the downwardly enlarging barrier 36 of deposited solids is believed to promote the downward growth of that barrier. The result apparently is that such downward growth of the barrier layer 36, and the accompanying downward expansion of the fixed or packed bed 31 occurs at a rate fast enough to prevent obstruction or clogging of the pores of the fixed bed section 31 at its interface with fluidized bed section 32. Sequential layers of deposited solids develop in the downwardly expanding fixed bed 31, as schematically indicated by lines 38 in FIGS. 5–7. However, since the codeposition of the medium and the filtered solids occurs continually, filtered solids are diffused throughout the accumulating medium.

Figure 7:
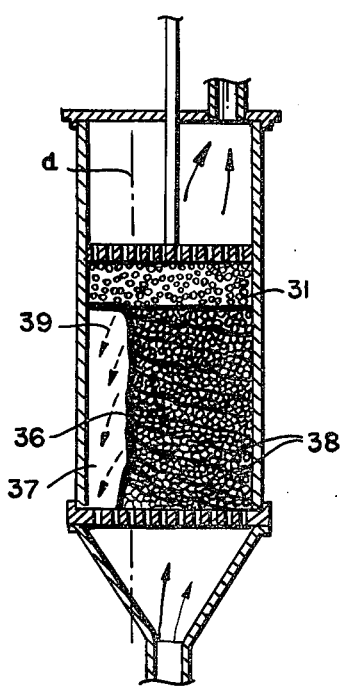

The second phase of the filtration operation can be continued until substantially all of the medium is transferred from the fluidized section to the packed section of the unit. Depending on the length of the filtration chamber, this condition may occur at about the time the downwardly extending packed section reaches the distributor 12, as illustrated in FIG. 7. By increasing the heights of the filtration chamber, more filtration media can be utilized, thereby permitting the second phase of the filtration operation to be prolonged, and further increasing the filtration capacity.

Figure 8:
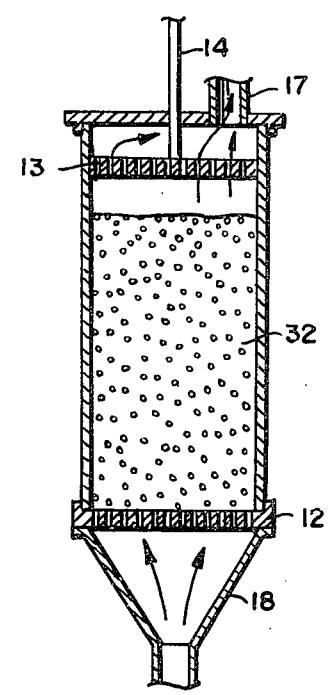
FIG. 8 is a schematic sectional view similar to FIGS. 3–7 but showing the system during a cleanup operation.

A cleanup or flushing operation may be carried out by raising the top porous plate so as to fully fluidize the medium and filtered solids with a purging fluid passing therethrough. Such a procedure is indicated in FIG. 8. The solids captured by the bed in the prior filtering operating are thereby flushed from the chamber and carried away through outlet 17. Thereafter, the upper plate 13 is again lowered into its original position, and the filtering operation described in connection with FIGS. 3–7 is repeated. By way of example, if in the filtration operation solid particles are removed from water, the water (without filtration) can be used for the washing operation. The wash water will carry out the deposited solids through the upper retainer, as illustrated in FIG. 8, while any particles of the medium reaching the retainer 13 will be kept within the filtration chamber. Where the top of the fully fluidized bed is substantially below the level of the raised retainer plate, as shown in FIG. 8, an outlet for the wash fluid can be provided beneath the upper position of the retainer. Further, in an alternate embodiment, if desired, inlets and outlets can be provided for changing the loaded filtration medium, the medium containing the accumulated solids being removed, cleaned external to the apparatus, and fresh clean medium being introduced into the apparatus for each new filtration cycle.

Fluids which may be used in the described process include both gases and liquids. Gases would include air, flue gas, combustion gas, oxygen, nitrogen, chlorine and other halogens, methane, ethylene and other hydrocarbons, and other organic and inorganic gases. They may also include vaporized organic and inorganic solids and liquids; for example, naphthalene and benzene. Liquids which may be used include water, hydrocarbons, alcohols and other organic and inorganic liquids and solutions.

The method of this invention is further illustrated by the following examples:

EXAMPLE 1

A semifluidized bed filter was constructed from a transparent plastic column with an inside diameter of 0.132 meters and a length of 0.457 meters between the porous bottom distributor plate and the outlet. The filtering medium consisted of minus 20 to plus 30 (20×30) mesh or minus 14 to plus 20 (14×20) mesh (American Standard Screen size) silica sand having an average particle diameter of 710 $\mu$m or 1100 $\mu$m, respectively. The density of the sand was 2600 kg/m$^3$. The minimum fluidization velocity of the 20×30 mesh sand was determined experimentally to be 13.1 m/hr. The sand between 0.149 m and 0.328 meter in depth under the least dense static condition was supported between a bottom distributor plate and a top movable porous plate. The fluid to be filtered was introduced below the lower plate. These plates retained the sand particles but allowed the entering slurry and the exit liquid to flow through. The slurry was composed of minus 50 mesh coal particles with a density of 1540 kg/m$^3$ dispersed in water. The solids were maintained in suspension in a slurry tank with agitation provided by a propeller mixer.

Prior to starting a filtration run, the top porous plate was moved to a pre-determined position as calculated using the equation given in the foregoing specification, which would result in a proper degree of fluidization with the introduction of the slurry. During the course of the filtration run, the top porous plate was maintained in that position. Filter performance was determined with 25% of the filtering medium initially in the packed section of the semifluidized bed. For comparison purposes, filtration with 100% of the bed particles in the packed section was also undertaken. Filtration with 100% of the bed particles in the packed section corresponds to conventional up-flow deep bed filtration.

During the filtering operation in which 25% of the filtering medium was initially disposed in the packed section of the semifluidized bed, changes in the appearance of the semifluidized bed were observed as generally represented in FIGS. 3–7. The performance of the semifluidized bed filter was found to be far superior to that of a conventional fixed bed filter in runs with both 20×30 mesh and 14×20 mesh sand as the filtration medium. The volume of slurry processed in the semifluidized bed filter was several times (2–6 times) that processed with a fixed bed filter, and, at the same time, no appreciable differences were observed in the quality of the filtrate produced.

The exhausted filter was cleaned by fluidizing the entire bed with water to remove the deposited solids. During this period, the upper porous plate was raised to a position well above the fluidizing sand particles. The coal particles which did not adhere to the sand were easily flushed from the filter in this manner. With the bed regenerated, the filtration cycle could then be reactivated.

EXAMPLE 2

Figure 2:
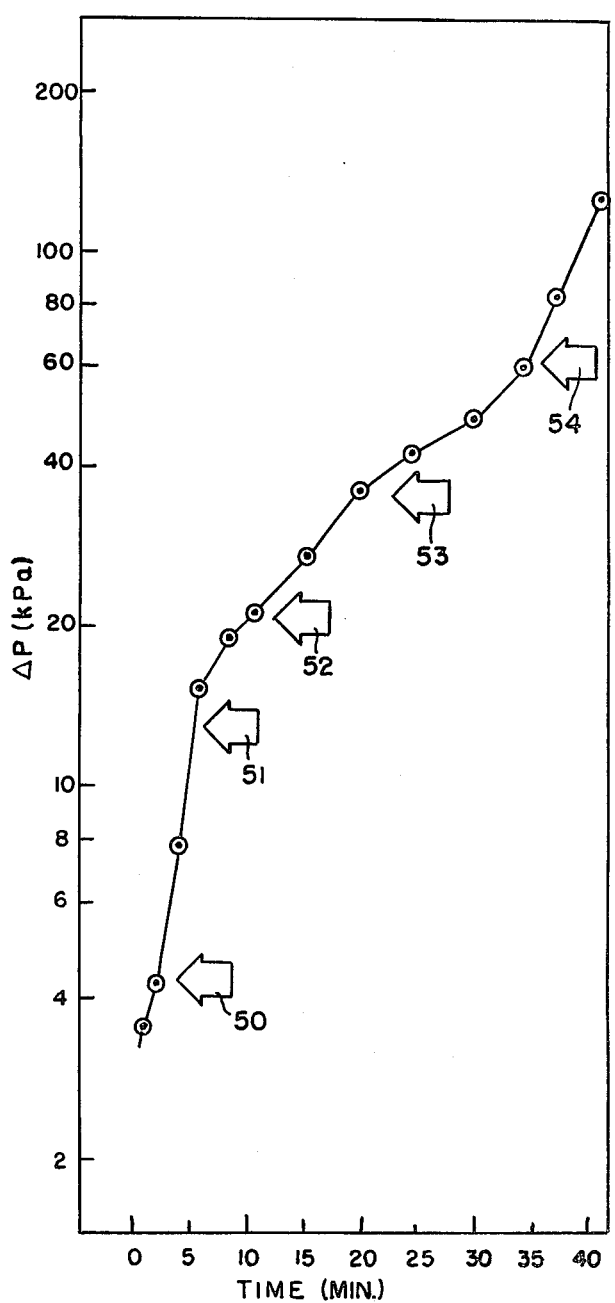
FIG. 2 is a graph illustrating characteristic changes in the pressure drop during a filtering cycle in which the method of the invention is used.

FIG. 2 is a graph showing the pressure buildup during a filtering operating utilizing a semifluidized bed with 25% of the bed particles initially in the packed section at the commencement of the filtering cycle. The column was prepared as set forth in Example 1 utilizing 20×30 mesh sand and a concentration of solids in the feed slurry ($c_i$) of 0.0165 weight percent. The points on the graph represent the pressure differential values that were observed at the times indicated. Changes in the appearance of the semifluidized bed occurred as generally indicated in FIGS. 3–7. The numbered arrows in FIG. 2 correlate respectively with FIGS. 3–7. The first phase of the filtration is represented by FIG. 3 with arrow 50 and FIG. 4 with Arrow 51, during which the initial packed section contains the same amount of filter medium. Occlusion of the pores of one portion of the fixed bed resulted in a rapid pressure buildup as indicated at 51 (schematically represented in FIG. 4). This was rapidly followed by a transition to the second phase of the filtration in which fluidized particles began to pack onto and form an extension of the packed section. During this period (arrows 52, 53, respectively schematically depicted in FIGS. 5 and 6) a noticeable reduction in the rate of pressure buildup was observed. The extension of the packed section, accompanied by a slower rate of pressure buildup, continued until all of the fluidized particles had shifted into the packed section of the bed (arrow 54, FIG. 7). In the final or third phase, no apparent change in the bed structure was observed and the rate of pressure buildup again rose sharply, as indicated in FIG. 2. When the flow of slurry was terminated, the bed collapsed.

THEORETICAL EXPLANATION

The method of this invention involves a novel mechanism of filtration. The theoretical explanation of the observed mechanism has not been established, but it can be related to certain known principles. Fluid velocity in a semifluidized bed is never constant with position in the bed, or with time, but varies constantly in conformance with the laws of fluid dynamics for turbulent flow. Further, a semifluidized bed in a filtration is an unstable system. No self-regulating mechanism exists. The reverse is true in that perturbations are self-sustaining. Thus, when the fluid velocity through a small area of the bed momentarily increases, the amount of solids deposited in that area in the small amount of time of increased velocity also increases. This increases the pressure drop in that area and shifts the flow to an adjoining area. Flow through the first area is not completely stopped but is reduced. Thus, deposition of solids is shifted also. Further, since the total flow is constant, the rate of flow through the remaining area is increased, resulting in an increase in the amount of filter medium held in the second area. This action is progressive and continuous and results in the observed novel filtration mechanism.

While in the foregoing we have disclosed an embodiment of the invention in considerable detail for purposes of illustration, it will be understood by those skilled in the art that many of these details may be varied without departing from the spirit and scope of the invention.

We claim:

1. The method of filtering particulate solids from a fine solids-containing fluid flowing upwardly through a semifluidization filtration chamber having a porous fluid distributor across the lower portion thereof, a porous medium retainer across its upper portion, and a semifluidized body of filtration medium captivated therebetween, said medium during the filtration being in the form of an upper packed section extending downwardly from said retainer and a fluidized section from the bottom of said packed section to said distributor, the bottom surface of said packed section providing an interface with said fluidized section, wherein the improvement comprises:

(a) in a first phase of a filtration cycle providing a packed section of at least sufficient downward extend to prevent breakthrough of the filtered solids as they are removed from said fluid by the packed section with concentration of the removed solids adjacent the interface between the packed and fluidized sections;

(b) continuing said filtration in said first phase without appreciably increasing the percent of said medium in said packed section until a filter cake of removed solids has accumulated across the packed section interface, said solids accumulation having taken place while the upward velocity varied between opposite adjacent wall portions of said packed section interface, said accumulated filter cake in one area adjacent a wall portion of said chamber containing a larger accumulation of solids than in an other area of thereof adjacent an opposed wall portion of said chamber so that upward fluid flow is diverted from said one area to said other area; and (c) in a second phase continuing said filtration with the fluid flow predominately through said other area to deposit additional medium together with filtered solids beneath said other area with a progressive increase in the downward extend of said packed section along said opposed wall portion, said second phase being continued until at least the major part of the total medium is in said packed section, said first and second phases being carried out without changing the position of said medium retainer within said filtration chamber.

2. The method improvement of claim 1 in which said packed bed at the start of said first phase contains less than 25% of said filtration medium.

3. The method improvement of claim 1 in which said second phase is continued until said filtration medium is substantially all contained in said packed section.

4. The method improvement of claim 3 in which the filtration is continued in a third phase after said second phase in which additional solids are deposited in the lowermost portion of said packed section.

5. The method of filtering particulate solids from a fine solids-containing fluid flowing upwardly through a semifluidization filtration chamber having a porous fluid distributor across the lower portion thereof, a porous medium retainer across its upper portion, and a semifluidized body of filtration medium captivated therebetween, said medium during the filtration being in the form of an upper packed section extending downwardly from said retainer and a fluidized section from the bottom of said packed section to said distributor, the bottom of said packed section providing an interface with said fluidized section, wherein the improvement comprises:

(a) in a first phase of a filtration cycle providing a packed section of sufficient downward extend to prevent breakthrough of the filtered solids as they are removed from said fluid by the packed section with concentration of the removed solids adjacent the interface between the packed and fluidized sections, said packed section in said first phase containing less than 50% of the total filtration medium;

(b) continuing said filtration in said first phase without appreciably increasing the percent of said medium in said packed section until a filter cake of removed solids has accumulated across the packed section interface, said solids accumulation having taken place while the upward velocity varied between opposite adjacent wall portions of said packed section interface, said accumulated filter cake in one area adjacent a wall portion of said chamber containing a larger accumulation of solids than in an other area of thereof adjacent an opposed wall portion of said chamber so that upward fluid flow is diverted from said one area to said other area; and (c) in a second phase continuing said filtration with the fluid flow predominately through said other area to deposit additional medium together with filtered solids beneath said other area with a progressive increase in the downward extend of said packed section along said opposed wall portion, said second phase being continued until substantially more than 50% of the total medium is in said packed section, said first and second phases being carried out without changing the position of said medium retainer within said filtration chamber.

6. The method improvement of claim 5 in which said packed bed at the start of such first phase contains not over 10% of said filtration medium, and said packed bed at the end of said second phase contains substantially all of said medium.

7. The method improvement of claim 5 in which said second phase is continued until the filtration medium is substantially all contained in said packed section, and thereafter the filtration is continued in a third phase in which additional solids are deposited in the lowermost portion of said packed section.

8. The method of claims 1, 2, 5, or 6 in which said fluid is a liquid.

9. The method of claims 1, 2, 5, or 6 in which said fluid is a gas.

10. A method of filtering fine solids from a fluid flowing upwardly through a semifluidization chamber having spaced porous upper and lower plates and a bed of discrete filter particles therebetween, comprising the steps of controlling the rate of upward flow of fluid within said chamber to produce semifluidization in which, at the commencement of a filtering operation, there is an upper packed bed section of particles immobilized against said upper plate by said upwardly flowing fluid and a lower fluidized bed section between said packed bed section and said lower plate; directing the upward flow to cause the velocity of fluid in a first vertical zone of said chamber to exceed the velocity in a second laterally-adjacent vertical zone; continuing to direct said fluid upwardly through said chamber at a substantially constant flow rate, without altering the spacing between said plates, until the porosity of said packed bed section in said first zone is obstructed by solids and the flow of fluid is deflected laterally thereby into said second zone where it continues upwardly through said packed bed section at increased velocity; and further continuing to direct fluid upwardly through said chamber at a substantially constant flow rate, without altering the spacing between said plates, as the packed bed section in said second zone expands gradually downwardly in said chamber to said lower perforated plate.

* * * * *